(12) United States Patent
Oliva

(10) Patent No.: US 6,504,820 B1
(45) Date of Patent: Jan. 7, 2003

(54) METHOD AND SYSTEM FOR CONNECTION ADMISSION CONTROL

(75) Inventor: Stephen Arthur Oliva, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/127,525

(22) Filed: Apr. 22, 2002

Related U.S. Application Data

(63) Continuation of application No. 09/192,034, filed on Nov. 13, 1998, now abandoned.

(51) Int. Cl.[7] ............................ H04J 1/16; H04J 3/14
(52) U.S. Cl. .................. 370/232; 370/395.2; 370/397
(58) Field of Search ........................... 370/232, 233, 370/234, 235, 395.1, 395.2, 397

(56) References Cited

U.S. PATENT DOCUMENTS

| | | | |
|---|---|---|---|
| 5,872,918 A | * 2/1999 | Malomsoky et al. | 709/220 |
| 6,034,960 A | * 3/2000 | Beshai et al. | 370/395.4 |
| 6,097,722 A | * 8/2000 | Graham et al. | 370/395.21 |
| 6,327,269 B1 | * 12/2001 | Adams et al. | 370/468 |

OTHER PUBLICATIONS

Hiroshi Saito, 'Dynamic Resource Allocation in ATM Networks', May 1997, IEEE Communications Magazine, pp. 146–153.*

Stephen Barrett and Luis Lopes, 'Statistical Multiplexing and Connection Admission Control in Mobile ATM Systems', 1997, IEEE.*

* cited by examiner

Primary Examiner—Hassan Kizou
Assistant Examiner—Tim Spafford
(74) Attorney, Agent, or Firm—Harley R. Ball; Steven J. Funk; Kevin D. Robb

(57) ABSTRACT

A method and system for Connection Admission Control (CAC) in a communications network, such as an ATM formatted B-ISDN network, is provided. Using end-to-end virtual path structures and class-of-service separation, various network virtual connections may be administered using a connection server based on a weighted round robin or similar connection-serving algorithm. Network users aware of the network structure and the means by which queue lengths are determined may easily calculate a Sustainable Cell Rate (SCR) for the traffic they wish to introduce into the network path for transmission to a given destination. The user declared SCR, in addition to other user declared traffic parameters, determines the queue lengths allocated in the network switches, such that a required level of Quality of Service is maintained. A measurement of certain types of transmitted cells in a virtual path, such as idle, unassigned, or low-priority cells, is made at any single point along the virtual path, such as at the source switch. This measurement of cells that may be considered to be "empty", i.e., available for use by high-priority cells, is used as the basis for a determination of the allowable connections that can be admitted to a virtual path. A relationship between the mean number of "empty" cells per scheduled cycle of the connection server and the cell rate bandwidth in cells-per-second that may be allowed to enter a virtual path that is already considered to be "full", based on the sum of the sustainable cell rates of its existing component connections, is used as the basis of CAC. Virtual connections may be admitted to a "full" virtual path if the cell rate of the requested connection is less than the allowable cell rate statistically determined from the mean number of "empty" cell timeslots in the path available for use by high-priority cells.

22 Claims, 7 Drawing Sheets

METHOD AND SYSTEM FOR CONNECTION ADMISSION CONTROL

RELATED APPLICATIONS

This application is a continuation of prior application Ser. No. 09/192,034, entitled "METHOD AND SYSTEM FOR CONNECTION ADMISSION CONTROL," filed Nov. 13, 1998 now abandoned, currently pending, incorporated by reference into this application.

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

1. Field of the Invention

This invention generally relates to connection admission control in a communications network. In particular, the invention relates to control methods and systems for admitting additional connections to a virtual path.

2. Description of the Prior Art

Various communications networks, such as Broad Band Integrated Services Digital Networks (B-ISDN) using Asynchronous Transfer Mode (ATM), are designed to ensure quality of service to users while attempting to maximize allocation efficiency of network resources. To maximize efficiency, the usage of available bandwidth within the network is maximized, which may result in a lesser quality of service.

Connection admission control (CAC) assists in efficient bandwidth utilization while maintaining quality of service. CAC is also used for the allocation of buffer resources associated with establishing new connections to a network. The Techniques for determining available bandwidth used for CAC may also be used for dynamic bandwidth control (DBC) where network resources, such as bandwidth and buffers, may be continually monitored and reallocated from underutilized paths to overutilized paths. In an ATM communications network, virtual connections are established to provide 53 byte packets or cells along virtual paths through the communications network. In these networks, CAC operations are performed when a virtual connection or virtual path is established, such as by accepting or rejecting a requested virtual connection to the network. The CAC strategy used may vary based on the type of network, such as an edge-core network where CAC processes are performed at edge switches or a step by step process where CAC is performed at each switch along the path. However, none of the various CAC methods are fully effective at handling variable bit rate (VBR) traffic.

In many CAC schemes, user-provided traffic parameters, such as peak and sustainable cell rates, are evaluated based on various assumptions to admit or deny a requested connection. For example, if the evaluated parameter exceeds an available bandwidth associated with a virtual path, the request to establish a connection is rejected. However, the evaluation of the traffic parameters may or may not accurately represent the cell arrival process associated with a requested virtual connection. Traffic parameters may not be unique to specific cell arrival processes, and the user may provide inaccurate traffic parameters. Inaccurate traffic parameters may result in under utilization or over utilization of the connection. Over utilization may result in lower quality of service where many cells are tagged as low priority.

Specific approaches to CAC include static and dynamic methods. For static methods, a user provided traffic parameter is applied to a model as discussed above. Once allocated, any resources to support the connection are left undisturbed for the life of the connection. For example, an end-to-end virtual path CAC method using a weighted round robin (WRR) queue serving has been proposed by K. Liu et al. ("Design and Analysis of a Bandwidth Management Framework for ATM Based Broad Band ISBN"), *IEEE Communications Magazine,* May 1997, pp. 138–145. Other static approaches with varying levels of bandwidth utilization include peak rate allocation, equivalent capacity or equivalent bandwidth where bandwidth for admission is determined as a function of the bursty nature of the traffic and an acceptable cell loss ratio where, cell loss probability (probability equations used to establish a cell loss requirement), and fast resource allocation (controlling cell admission rather than connection admission).

Dynamic CAC methods typically rely on a measurement, allowing CAC decisions based on current resource utilization. Various measurements are used, such as the number of arriving cells, buffer occupancy, and the number of cells lost. Specific approaches include probability distributions of arriving cells (developing a probability distribution of arriving cells during a particular period to estimate a cell loss ratio assuming a requested connection is admitted), aggregate cell statistics (estimating bandwidth calculations or cell loss ratios based on statistic probabilities), measured buffer occupancy or virtual buffers (guaranteed fraction of cell loss ratio with renegotiation of traffic parameters), deviation rate functions (large deviation rate functions used to predict bandwidth requirements by estimating the existing load of cell arrivals and prediction of the bandwidth required based on the user-declared traffic parameters), and measurement of end-to-end delay (derives buffer and connection resources in use by measuring transmission times). Fuzzy logic and neuro-network approaches have also been proposed. However, many of these methods of CAC rely on estimates of statistical characteristics of the traffic or estimate certain parameters of the network, which may result in underutilized bandwidth. Furthermore, various methods, such as the deviation rate functions, are computationally complex and are carried out for each switch along a virtual path, requiring a step-by-step CAC process as each connection proceeds through the network.

Other dynamic CAC techniques are based on end-to-end virtual path architectures. However, these methods require a measurement of cell arrivals at every connection in a path. See for example, K. Liu et al. ("A Measurement-Based CAC Strategy for ATM Networks"), *Proceedings of IEEE ICC* '97, 1997.

The present invention is directed to improvements that more efficiently utilize bandwidth based on measurements that may be more accurate and efficient.

BRIEF SUMMARY OF THE INVENTION

The present invention is defined by the following claims, and nothing in this section should be taken as a limitation on those claims. By way of introduction, the preferred embodiment of the present invention described below is directed to a system and method for connection admission control using virtual path empty cell measurement and statistically determined allowable additional bandwidth on a virtual path.

The present invention relates to improvements in the efficiency of network resource allocation. Cell time slots, such as those serving idle, unassigned or low priority cells, may be considered to be empty since they may be replaced by high priority cells. These effectively empty cell time slots (herein "empty cell time slots") are measured and used to statistically determine the allowable bandwidth. New connections are admitted if the requested bandwidth is less than the allowable bandwidth. By measuring the number of empty cell time slots transmitted on a virtual path, the bandwidth of the communications network is more efficiently allocated by statistically utilizing the results of the measurement.

In one embodiment for using empty cell time slots as a means to determine allowable bandwidth, a weighted round robin queue structure is used with a virtual path connection establishing an end-to-end path within the communications network. Empty cell time slots at one location in the virtual path may be measured. By computing the allowable bandwidth associated with the number of empty cell time slots and comparing the allowable bandwidth to the user-defined bandwidth of a requested connection, connection admission control is performed. Measurement and statistical evaluation of empty cell time slots within a virtual path mitigates inaccuracies associated with user traffic parameters and allows for simple calculations.

In a particular first aspect of the invention, a method for connection admission control in a communications network is provided. A virtual path associated with a plurality of virtual connections is established from a source switch in the communications network to a destination switch. Cells associated with the plurality of virtual connections into the virtual path are scheduled. A bandwidth associated with empty cell time slots in the virtual path at a source switch server is measured. An additional virtual connection with an associated bandwidth is admitted to the communications network and virtual path if the additional connection bandwidth is less than the calculated bandwidth associated with the empty time slots.

In a second aspect of the invention, at least a source switch and a destination switch establish a virtual path associated with a plurality of virtual connections to the source switch. A first source switch server schedules cells associated with the plurality of virtual connections into the virtual path, and a processor determines a bandwidth associated with empty cell time slots in the virtual path. A plurality of queues operatively connect to the first source switch server and each of the plurality of virtual connections. The switch admits an additional virtual connection to the virtual path if a bandwidth associated with the additional connection is less than the bandwidth associated with the empty cell time slots. The first source server and the processor may comprise a same server.

In other embodiments, additional virtual connections may be admitted only if the virtual connection bandwidth is less than a fraction of the bandwidth associated with the empty cell time slots. Furthermore, the bandwidth associated with empty cell time slots may be determined based on measurement over a plurality of weighted round robin cycles.

DETAILED DESCRIPTION OF THE INVENTION

Implementing the CAC discussed below in a communications network may improve bandwidth utilization on virtual paths containing VBR traffic. Admitting a new connection to the virtual path based on a measurement of empty cell time slots at a single location in the virtual path results in less complexity than other methods. Statistical determination of the allowable bandwidth from the number of empty cell time slots may provide a higher percentage of network resource utilization. Quality of service is maintained through buffer allocation based on user-provided parameters. Furthermore, various virtual paths are controlled separately for less complexity.

A communications network for using the inventive CAC is described below. After describing the network and components associated with CAC, the inventive CAC methods using measurement of empty cell time slots in the virtual path to statistically determine an allowable bandwidth is further disclosed.

I. Communications Network

A. General

Figure 1:
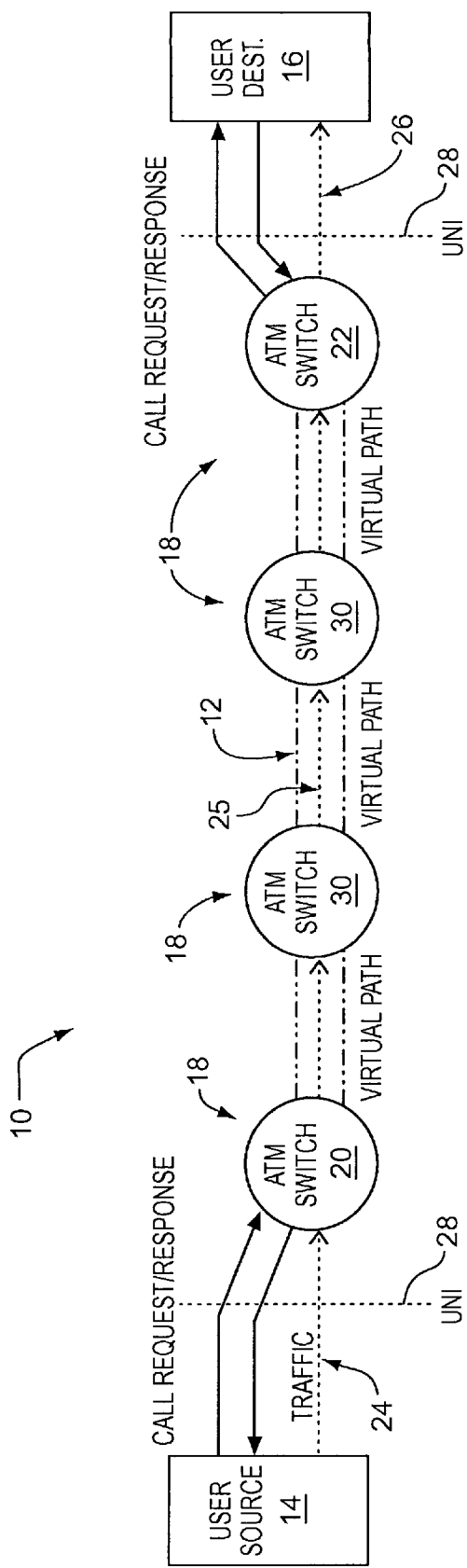
FIG. 1 is a schematic block diagram of one embodiment of a communications network using connection admission control in accordance with the present invention.

Referring to FIG. 1, a schematic depiction of one embodiment of a communications network with connection admission control is generally shown at 10. Using virtual path 12, communications network 10 connects user data source 14 to user data destination 16. Virtual path 12 is established by a plurality of switches 18, including source switch 20, destination switch 22 and intermediate switches 30. In alternative embodiments, virtual path 12 extends from source switch 20 to destination switch 22 without passing through intermediate switches 30. In other alternative embodiments, virtual path 12 comprises three or more switches 18.

Virtual connection 24 from user data source 14 to source switch 20 along virtual path 12 is established for the transfer of data (see connection 25). Likewise, virtual connection 26 connects user data destination 16 to destination switch 22 of communications network 10. Source and destination switches 20 and 22 connect to components outside of communications network 10 through user-to-network interfaces 28. Various switch architectures may be used, including any non-blocking switch architecture having outputs that assure service at a rate required by the traffic stream, such as weighted round robin architectures. Preferably, weighted round robin output queuing and serving is used.

Communications network 10 may comprise various network architectures including additional switches not part of virtual path 12. Communications network 10 comprises either a homogeneous or nonhomogeneous network. In homogeneous networks, all nodes or switches 18 perform source or destination switching for both virtual connections and virtual paths. In nonhomogeneous or edge-core networks, edge switches 20 and 22 perform source and destination switching for virtual connections and virtual paths (i.e., the edge) and intermediate switches 30 perform virtual path functions (i.e., the core). Preferably, communications network 10 comprises an edge-core network.

In one embodiment, communications network 10 comprises a B-ISDN using ATM data transmission formats. Other network structures and data transfer formats may be used. For ATM-based systems, data is transferred in 53 byte cells as virtual connection 25 over virtual path 12 and virtual connections 24 and 26. Each cell includes a 5 byte header and 48 bytes of data, and the data may be associated with voice, picture, video, computer or other data. Using ATM, the cells are statistically multiplexed onto virtual connections 24 and 26 and virtual path 12.

Virtual path 12 and any other virtual paths in communications network 10 are established as end-to-end paths from source switches 20 to destination switches 22. The initial bandwidth of the virtual paths may vary from one path to another and is a function of switches 18 and associated buffers for the path. The buffer and server resources of switches 18 are preferably sufficient to ensure a quality of service desired by users. In one preferred embodiment, virtual path 12 is not altered during use to pass through different switches 18, but in other embodiments virtual path 12 may be altered to pass through different switches. Virtual path 12 allows the transfer of cells associated with one or more virtual connections 24.

As initially established, virtual path 12 preferably has a bandwidth that is larger than the sum of the bandwidth associated with the corresponding virtual connections 24. Since the users provide the cells, the user provides the bandwidth requirements for each virtual connection 24.

The user communicates the desired bandwidth to communications network 10 in the form of traffic descriptor parameters. For constant bit rate traffic, a peak cell rate parameter is provided; for variable bit rate traffic, a sustainable cell rate, a peak cell rate and maximum burst size parameter are provided; for available bit rate traffic, a minimum and maximum cell rate parameters are provided. Other parameters may also be provided for any of the types of traffic. One of the various methods is used for calculating the parameters for the traffic. For example, the sustainable cell rate is calculated as a function of a peak cell rate and an average cell rate. Based on the cell rate traffic descriptors, a bandwidth or rate for transferring cells on virtual connection 24 through virtual path 12 is determined.

B. Source and Destination Switches

Figure 2A:
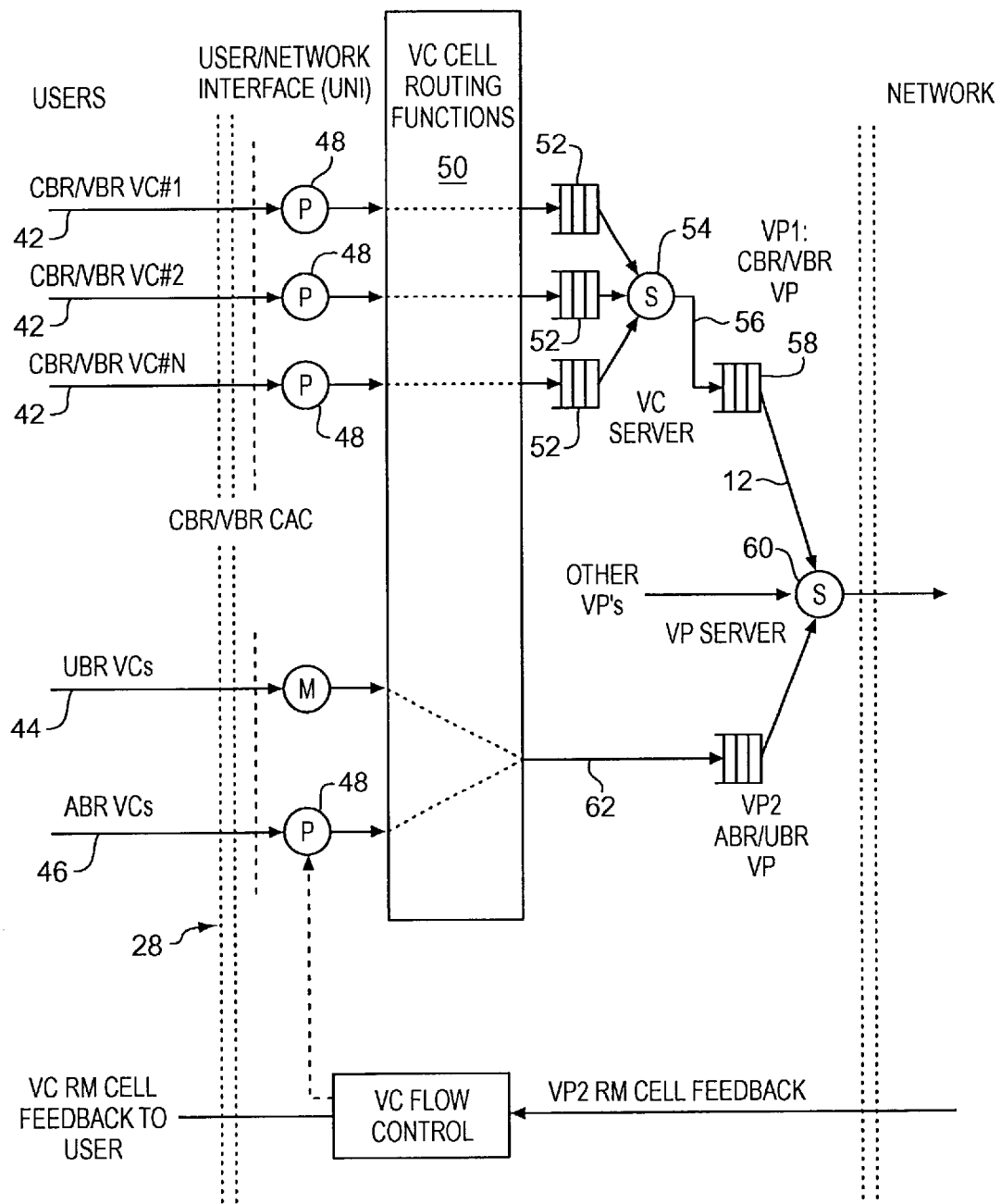
FIG. 2A is a schematic block diagram of an embodiment of a source switch and associated virtual connections and paths.

Referring to FIG. 2A, a schematic depiction of one embodiment of a source switch for implementing CAC is shown generally at 40. Source switch 40 includes processors 48 for policing virtual connections 42 and 46, virtual connection cell routing functions 50, virtual connection buffers or queues 52, virtual connection processors or servers 54, source 56 of virtual path 12, virtual path buffer or queue 58, and virtual path processor or server 60. Other switch structures and schematics may be used. Preferably, each connection 42, 46 is guaranteed quality of service on virtual path 12, and virtual path 12 is guaranteed the required quality of service through the communications network 10. Source switch 40 connects through the user-to-network interface 28 with various virtual connections 42, 44, and 46.

In a preferred embodiment, unspecified bit rate traffic and available bit rate traffic are transferred in separate virtual path 62 from constant bit rate and variable bit rate traffic. By providing this class of service separation, empty cell time slot measurements may be more accurate, and changes in network parameters that could effect ABR cell transmission rates may not effect CBR and VBR traffic. In alternative embodiments, only variable bit rate traffic is transferred over virtual path 12, or other types of traffic are transferred over virtual path 12.

As constant bit rate or variable bit rate traffic enters on virtual connections 42, processors 48 police the arriving cells. To police the traffic, usage parameter control functions utilizing the ATM forum-defined Generic Cell Rate Algorithm are preferably used. Other policing algorithms may be used. If a cell associated with a particular virtual connection 42 exceeds the user provided traffic descriptor, the cell is either tagged as low priority or is prevented from entering the associated queue 52 (i.e., the cell is dropped). The usage parameter control function prevents a violation of the user contract established as a function of the user provided traffic descriptors. Preferably, if bandwidth associated with a virtual connection 42 is being unused, low priority cells are allowed to be transmitted on virtual path 12. Alternatively, no transmission is performed in the unused bandwidth of virtual connection 42. Low priority cells include cells designated as low priority by the user or cells designated low priority by processor 48.

The cells are routed to appropriate queues 52 by routing function 50. For example, ATM routing is used based on call header information.

In one preferred embodiment, queues 52 are established and serviced by virtual connection server 54 pursuant to a round robin or weighted round robin algorithm. Various algorithms for queue service, such as fair queuing scheduling algorithms, may be used. Preferably, a weighted round robin schedule algorithm is used. For weighted round robin queuing, each queue 52 is serviced at a frequency that is a function of a weight. The weight is determined as a function of the user-provided traffic descriptors and the bandwidth of virtual path 12. For variable bit rate traffic, the weight is established as a function of the sustainable cell rate descriptor, and for constant bit rate traffic, weight is a function of the peak cell rate descriptor. For example and referring to FIG. 4, the weighted round robin schedule includes six cell slots per cycle. Virtual connection no. 1 is associated with a weight of 1, virtual connection no. 2 is associated with a weight of 3, and virtual connection no. 3 is associated with a weight of 2. One cell of the weighted round robin cycle is scheduled and serviced from queue 52 for virtual connection no. 1, three cells of the cycle are scheduled and serviced from queue 52 for virtual connection no. 2, and two cells of the cycle are serviced and scheduled from queue 52 for virtual connection no. 3.

The queue configuration is preferably capable of being arranged such that the queues are of sufficient length to ensure no cell loss and minimal cell delay. The required queue size is calculated as a function of the user provided traffic descriptors.

Pursuant to the weighted round robin scheduling of queues 52, virtual connection server 54 places the cells in the virtual path 12. By placing the cells on virtual path 12, virtual connection processor or server 54 establishes source 56 of virtual path 12. The cells on virtual path 12 are initially stored in virtual path buffer 58. Virtual path processor or server 60 obtains the cells from buffer 58 and transfers the cells to the remainder of the communications network.

Virtual path server 60 may combine a plurality of virtual paths onto a higher bandwidth path or may transmit cells for one virtual path on a connection to the remainder of the communications network. Other virtual connection and virtual path server structures may be used, such as one server controlling virtual connections 42 and virtual path 12.

Figure 2B:
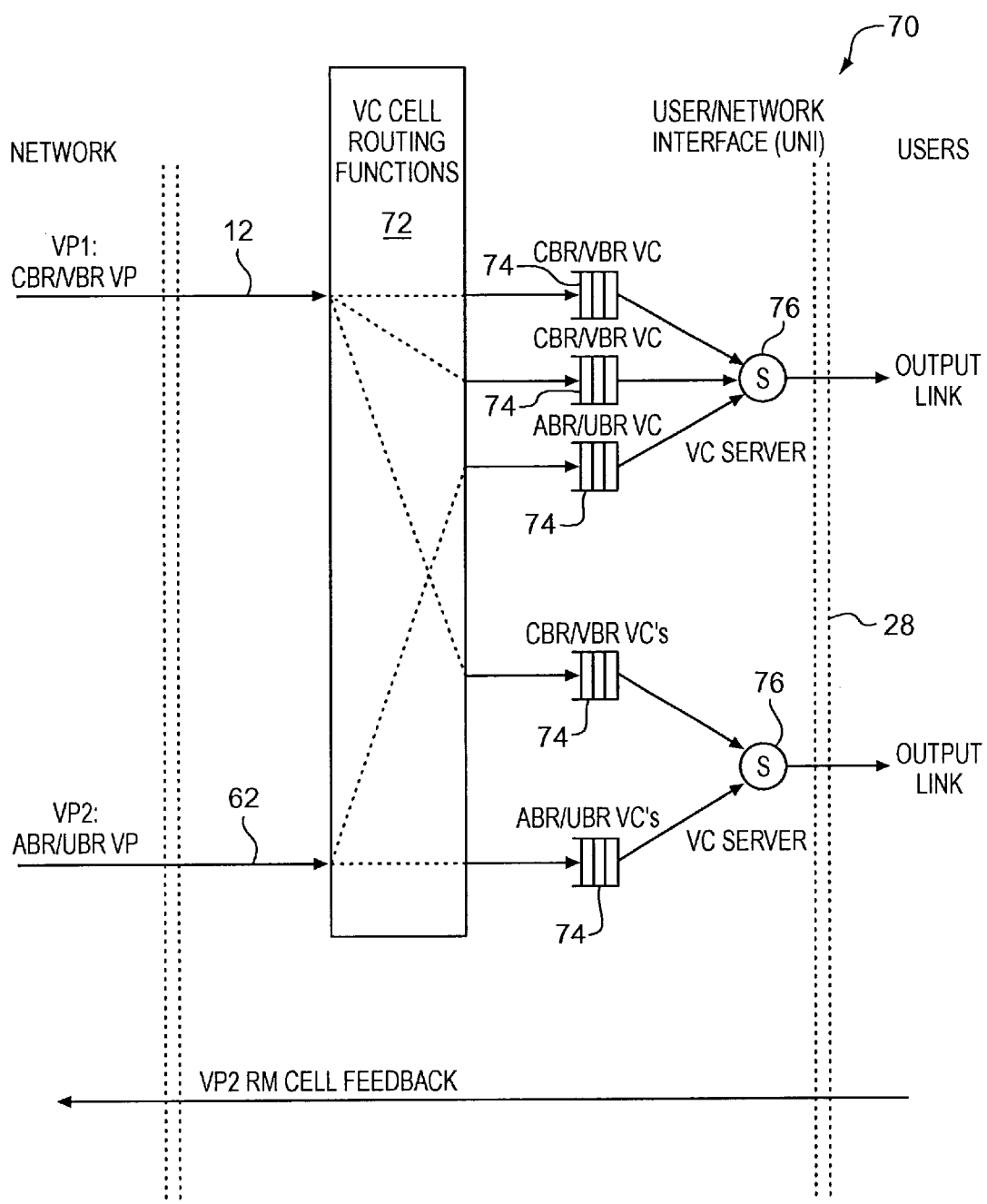
FIG. 2B is a schematic block diagram of one embodiment of a destination switch and associated virtual connections and paths.

Referring to FIGS. 2B, a schematic representation of one embodiment of a destination switch for receiving cells from one or more virtual paths is generally shown at 70. Destination switch 70 includes an interface with virtual path 12, the available and unspecified bit rate virtual path 62 and possibly other virtual paths. The cells from virtual paths 12 and 62 are routed to the appropriate virtual connections by routing function 72. Destination switch 70 includes queues 74 and 76 for receiving cells associated with particular virtual connections. Destination switch 70 also includes virtual connection server 76 for interfacing and controlling the transfer of cells through user-to-network interface 28 to the destination user. Other destination switch structures and associated schematics may be used.

II. CAC Methods Based on Empty Cell Time Slot Measurement

A. General

Figure 3:
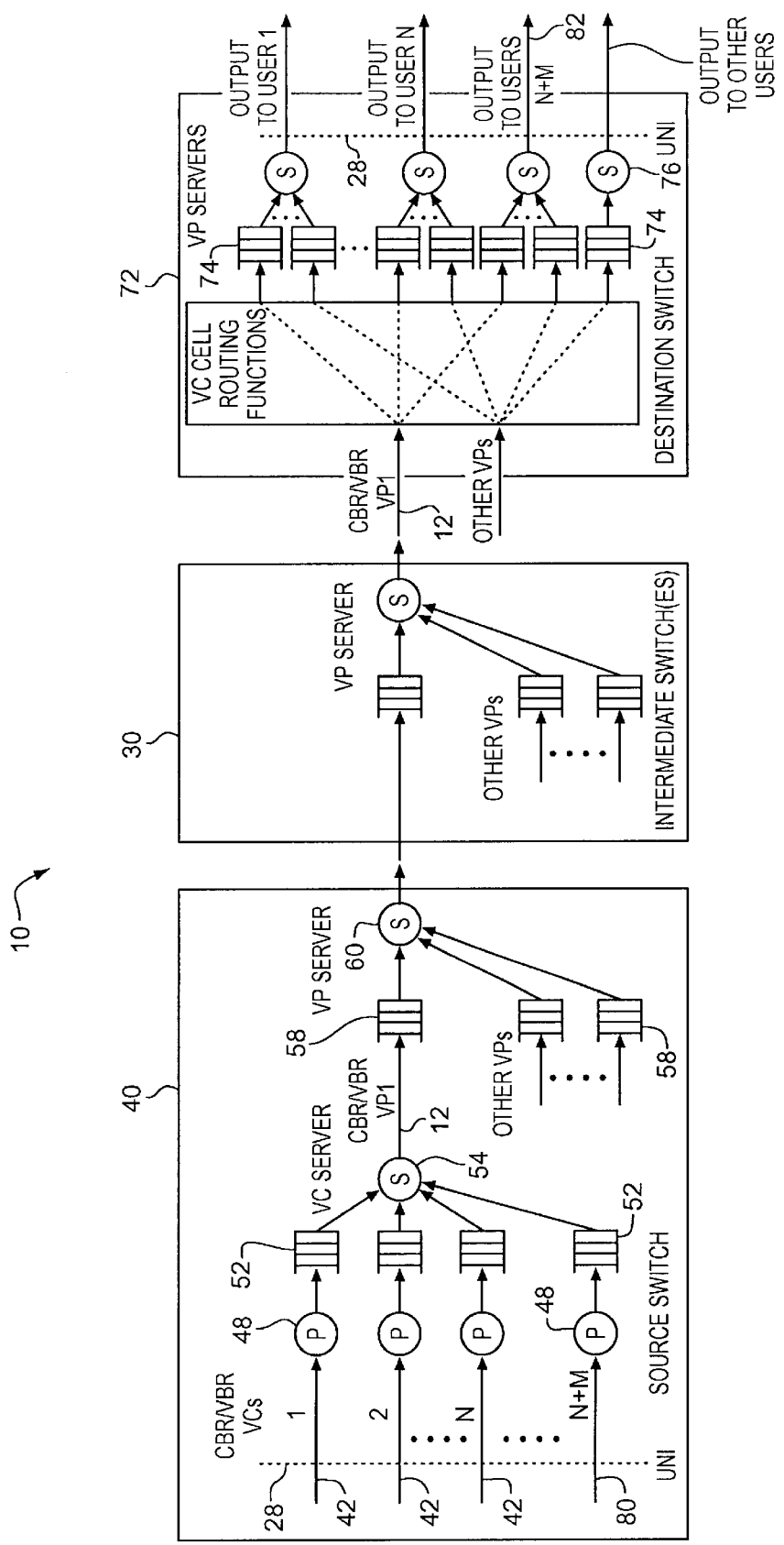
FIG. 3 is a schematic block diagram of another embodiment representing a communications network with various switches and associated virtual connections and paths, including an additional connection.

Referring to FIG. 3, a graphical representation of a portion of communications network 10 for transmitting cells along a virtual path and controlling admission of an additional connection is generally shown. Source switch 40 and destination switch 72 are also schematically represented. To add an additional virtual connection to virtual path 12, source switch 40 implements CAC. Preferably, virtual connection server 54 implements the CAC algorithm.

As shown, virtual path 12 is associated with virtual connections 42. A user provides a request to connect additional virtual connection 80 to virtual path 12. Additional virtual connection 80 may comprise first, second or further virtual connections to virtual path 12. As shown in FIG. 3, N virtual connections 42 exist on virtual path 12. Additional virtual connection 80 represents at least the $N^{th}+1$ virtual connection where M represent the number of additional connections 80. Additional virtual connection 80 is associated with additional virtual connection 82 at destination switch 72 of virtual path 12.

To maintain a quality of service and allow efficient use of network resources, the CAC algorithm controls congestion by admitting or denying the admission of an additional virtual connection with the associated required bandwidth. A bandwidth associated with additional virtual connection 80 may be compared to an allowable bandwidth responsive to a measurement of the number of empty cell time slots transferred along virtual path 12.

B. Additional Virtual Connection Information

A user provides a traffic descriptor for additional virtual connection 80. A peak cell rate is provided for constant and variable bit rate traffic. Further, a sustainable cell rate and a maximum burst size is provided for variable bit rate traffic. Using the traffic descriptors, virtual connection server 54 determines a bandwidth associated with additional virtual connection 80. Preferably, the bandwidth equals the peak call rate for constant bit rate traffic and equals the sustainable cell rate for variable bit rate traffic. Other bandwidth calculations may be used.

Network resources are allocated as a function of the user provided traffic descriptor for additional virtual connection 80 as well as the existing virtual connections 42. For example, the queue length for variable bit rate traffic is determined as a function of the burst tolerance $\tau$. The maximum burst size (MBS) is equal to $$\left\lfloor 1 + \frac{\tau_s}{T_s - T} \right\rfloor$$

where T is 1/(peak cell rate) and $T_s$ is 1/(sustainable cell rate). The maximum queue length (MQL) is equal to $$1 + \frac{\tau}{T},$$

assuming a generic cell rate algorithm (GCRA) is being used to police connections and is capable of tagging cells as low priority cells. For constant bit rate traffic, the MQL is equal to 1. For variable bit rate traffic, the maximum queue length is sufficient to hold $$1 + \frac{\tau_s}{T_s}$$

cells.

Preferably, the user is aware of the weighted round robin servicing and CAC methods implemented by communications network 10. The user estimates the appropriate traffic descriptor, such as SCR, using any one of various techniques and with knowledge of approximate buffer size as a function of the SCR and how the SCR traffic descriptor will be used to calculate the buffer size or MQL. Since communications network 10 preferably uses weighted round robin queuing with class of service separation between virtual paths, SCR traffic descriptors and maximum queue lengths may be simultaneously solved. Therefore, the user provided SCR may be more accurate than would otherwise be the case.

For example, the equivalent capacity of a two-state (on/off) source of VBR traffic having Markov characteristics, which is flowing into a queue of finite capacity, is the queue service rate that provides a specified cell loss probability (CLR) (i.e. buffer overflow probability) of $\epsilon$.

Fluid flow approximations and other simplification equations for equivalent capacity of a single source of VBR traffic and multiple sources of VBR traffic have been developed. For a single source of VBR traffic having an average cell arrival rate of $\lambda$, each cell being served during period T1, the equivalent capacity $\hat{c}$ is determined from:

$$\hat{c} = \frac{\alpha B(1-\rho)R_{peak} - L + \sqrt{[aB(1-\rho)-L]^2 + 4La B\rho(1-\rho)R_{peak}}}{2\alpha\beta(1-\rho)} \quad (1)$$

where L is the queue length, $$a = \ln\left(\frac{1}{\varepsilon}\right),$$

B is the mean burst period of the source, $\rho = \lambda T$ is the utilization of the source flowing into the queue, and $R_{peak}$ is the peak rate of the source (PCR).

Since the WRR approach has one channel source of traffic per queue, the above equivalent capacity equation is set to equal the SCR and solved for queue length, L, resulting in $$L = SCR \cdot \log\left(\frac{1}{\varepsilon}\right) \cdot B \cdot \left(\frac{-PCR \cdot p + SCR \cdot \rho + PCR - SCR}{PCR \cdot p - SCR}\right) \quad (2)$$

The MQL Equations may also be solved in terms of PCR, SCR, and MBS, yielding an equation for queue length, L, resulting in $$L = MQL = 1 + \left(\frac{(MBS - 1) * (PCR - SCR)}{PCR}\right) \quad (3)$$

L and SCR may be simultaneously solved. Other determinations of queue length and SCR may be used.

C. CAC Method Of Preferred Embodiments

The communications network 10 uses two levels of CAC. In the first level, the bandwidth associated with additional connection 80 is compared to an amount of bandwidth of virtual path 12 in use based on the traffic descriptors for all connections 42. If the bandwidth associated with additional connection 80 is less than the difference between the sum of the SCRs for all connections 42 and the virtual path capacity, then additional connection 80 is admitted. The second level is used if the additional connection 80 is not admitted based on the first comparison. In the second level, an allowable bandwidth is statistically determined from a measurement of empty cell time slots. The additional bandwidth is compared to the allowable bandwidth.

Figure 5:
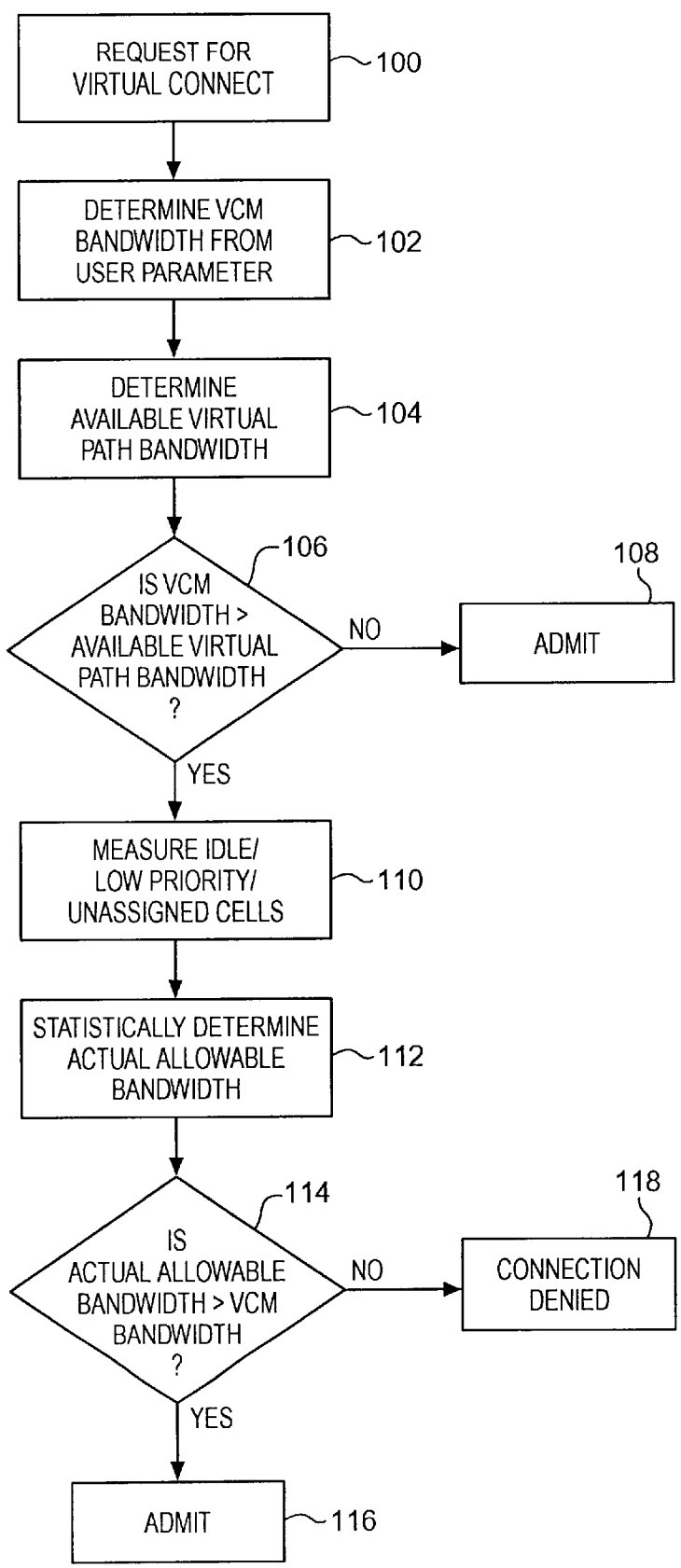
FIG. 5 is a flow chart diagram of one embodiment of the present invention representing connection admission control.

Referring to FIG. 5, a flow chart diagram demonstrating CAC associated with additional virtual connection 80 of FIG. 3 is shown. In the first CAC level step 100, source switch 40 receives a request for additional virtual connection 80. The request for additional virtual connection 80 is routed to virtual path 12 for the requested destination.

In step 102, the bandwidth for additional virtual connection 80 is determined from a user traffic descriptor or descriptors. For example, the bandwidth of additional virtual connection 80 is determined from an SCR parameter for VBR traffic or from a PCR parameter for CBR traffic.

An available bandwidth associated with virtual path 12 is determined in step 104. To determine the available bandwidth of virtual path 12, the amount of bandwidth in use is calculated from user traffic descriptions. The bandwidth in use is calculated as the sum of SCR parameters for variable bit rate connections on virtual path 12 plus the sum of PCR parameters for constant bit rate connections on virtual path 12. Other traffic descriptors, traffic types and functions may be used for determining the bandwidth in use of virtual path 12. The bandwidth in use is subtracted from a bandwidth of virtual path 12. The bandwidth of virtual path 12 is determined from network resources, such as queues 58 or 52 dedicated to virtual path 12. The resulting difference is the available bandwidth on virtual path 12. Other functions may be used.

If the additional bandwidth associated with additional virtual connection 80 is not greater than the available bandwidth of virtual path 12, additional virtual connection 80 is admitted as represented in steps 106 and 108. Once admitted, additional virtual connection 80 is serviced pursuant to the weighted round robin queue structure and policing as discussed above.

If the additional bandwidth associated with additional virtual connection 80 is greater than the available bandwidth of virtual path 12, additional virtual connection 80 may still be admitted pursuant to the second level of CAC of the preferred embodiment. Therefore, the bandwidth of virtual path 12 is efficiently used for admitting the maximum number of virtual connections 42. This allocation of bandwidth is preferably accomplished with no or minimal risk to quality of service.

In step 110, the number of empty cell time slots in virtual path 12 is measured. As used herein, empty cell time slots include idle cell time slots, cell time slots that have been designated as low priority, unassigned cell time slots, and cell time slots usable as empty cell time slots for replacement by high priority cells time slots.

Admitting additional virtual connection 80 where the additional bandwidth is greater than an available bandwidth of virtual path 12 is based on the probability of queues being unused or having a low priority cell time slot. Unused or low priority cells time slots indicate that additional traffic may be inserted into the weighted round robin schedule with little or no effect on the flow of high priority cells. Based on the bursty nature of variable bit rate traffic and the nature of assigning SCR parameters, some cell slots in the schedule are likely to be unused or marked as low priority in each weighted round robin cycle. Measurement of empty cell time slots may determine a data rate which may be supported by virtual path 12 that is greater than the calculated available bandwidth. The probability, $P_o$, of an unused or low priority queue being empty is equal $1-\lambda T$, where $\lambda$ is the average rate of cell arrival to the queue and T is the service rate of the queue. The service rate may equal the SCR or other traffic descriptor providing an upper bound on conforming traffic.

Figure 4:
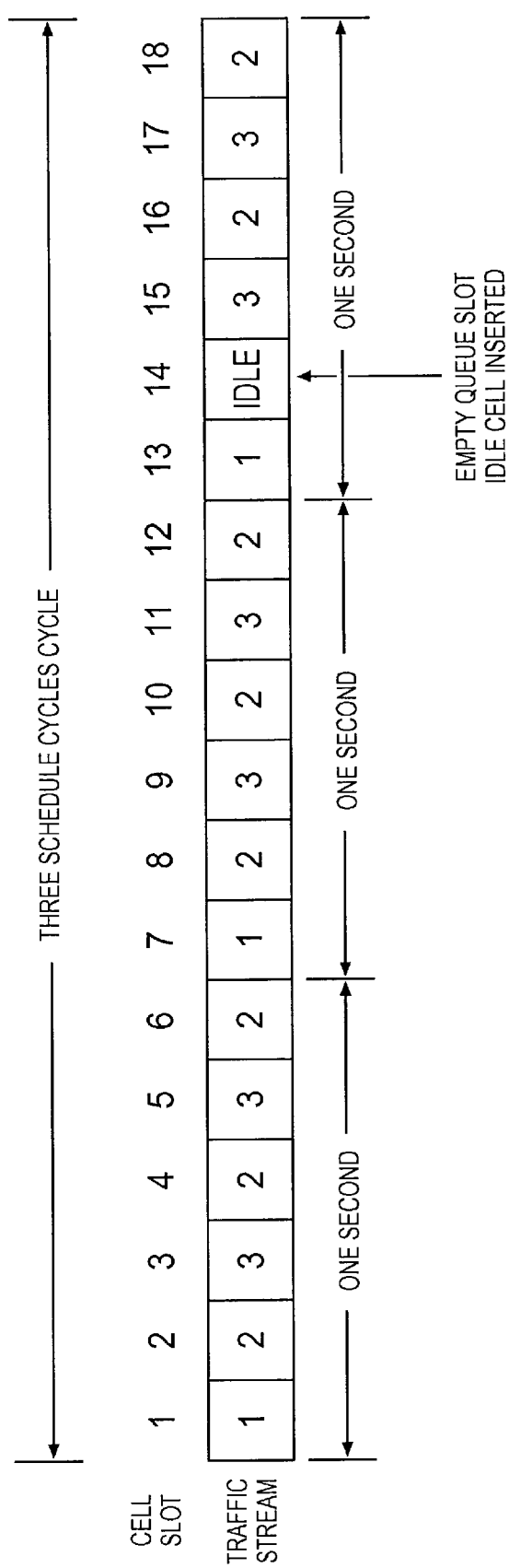
FIG. 4 is a graphical representation of one embodiment of weighted round robin scheduling and associated cycles.

Referring to FIG. 4, a graphic representation of one embodiment of cell scheduling on a virtual path using weighted round robin techniques for using empty cell time slots is shown. As shown, one weighted round robin schedule includes six cell slots per second. Three cycles are shown. In the third cycle, cell slot no. 2, corresponding to total slot no. 14, is an empty cell, such as caused by the bursty nature of the traffic sources. That empty cell time slot plus any other nondedicated or available bandwidth of virtual path 12 is useable for servicing additional virtual connection 80. Either additional information is inserted into the empty cell time slot, or the remaining cell time slots of that cycle are moved forward one cell time slot and an additional cell is inserted at the end of the cycle.

Referring to FIG. 3, the number of empty cell time slots is preferably measured at the source of virtual path 12. For example, virtual connection processor or server 54 comprises a source of virtual path 12. In other embodiments, virtual path buffer 58 or virtual path processor or servicer 60 performs the measurement of empty cell time slots. In yet other embodiments, the number of empty cells time slots is measured along other portions of virtual path 12, whether or not in source switch 40.

Referring to FIG. 5, the mean number of empty cell time slots per cycle arriving at the measurement point, such as the source of virtual path 12, are measured in step 110. In step 112, the actual allowable bandwidth is determined from the measurement. For example, the bandwidth is statistically determined from the mean number of empty cell time slots per cycle. The allowable bandwidth represents the useable bandwidth to be assigned to additional connections, even when the available bandwidth would be considered full based on the traffic descriptor calculations of steps 104 and 106.

In one embodiment, the measurement of empty cell time slots and the associated bandwidth determination are performed over a plurality of cycles. The allowable bandwidth is statistically determined using parameter estimation. For example, the measurement of empty cell time slots is performed over a required number of weighted round robin cycles as determined by traffic descriptors provided by the users and a statistical evaluation of confidence in the mean number of empty cell time slots per cycle over time. The number of cycles used for determination may be selected as a function of a burst period associated with variable bit rate traffic. For example, the measurement of empty cell time slots is performed over a greater number of cycles for longer burst traffic than for shorter burst traffic.

In step 114, the additional bandwidth of additional virtual connection M is compared with the allowable bandwidth. By measuring the empty cell time slots in virtual path 12, allowable bandwidth accounts for the available bandwidth discussed above in step 104. Any additional connection having additional bandwidth not exceeding the allowable bandwidth measured in virtual path 12 is admitted as long as a sufficient quantity of available queues for buffering the additional bandwidth are available. If the allowable bandwidth is greater than the additional bandwidth of additional virtual connection 80, the virtual connection is admitted as shown in step 116. Admitting additional connection 80 may effect cell delay variation, as queues associated with empty cell time slots may be skipped in any given weighted round robin cycle.

If the allowable bandwidth is less than the additional bandwidth of the additional virtual connection 80, the request for connection is denied in step 118. The request may be made at a different virtual path or repeated at virtual path 12 at a later point in time.

In one embodiment, the determination to admit or deny additional virtual connection 80 in step 114 is based on a statistical relationship determined from user parameters and the measurement of empty cell time slot statistics. By using this statistical relationship, the cell loss ratio associated with additional connection 80 is kept within required limits. The allowable bandwidth remaining following the addition of additional connection 80 is used to transmit low priority, other non-conforming cells or high priority cells.

D. Mathematical Implementation Of Preferred Embodiments

In one embodiment of the present invention, step 112 of determining the allowable bandwidth is performed as described below. The number of empty cell time slots per cycle is used to statistically determine the allowable bandwidth. In particular, the mean and variance of the number of empty cell time slots per cycle are used to statistically determine an approximate allowable mean. The approximate allowable mean is used to determine the allowable bandwidth.

The measurement of the number of empty slots per cycle are used to calculate the empty cell time slot or sample mean, X(n), at each cycle. The sample mean is a function of the number of cycles, n, that have elapsed since measurement started and the empty time slots per cycle.

$$X(n) = \frac{\sum_{i=1}^{n} X(i)}{n} \quad (4)$$

The variance of the mean is calculated using one of various methods. If the number of empty cell time slots per cycle are independent, an unbiased estimator of the variance of the sample mean is $$Var[X(n)] = \frac{S^2(n)}{n} = \frac{\sum_{i=1}^{n}[X(i) - \overline{X}(n)]^2}{n(n-1)} \quad (5)$$

If the actual mean and variance of the process producing the number of empty time slots per cycle is stationary over time, but the samples are correlated, the variance may be estimated from $$\hat{V}ar[X(n)] = \frac{S^2(n)}{n}\left[1 + 2\sum_{j=1}^{n-1}\left(1 - \frac{j}{n}\right)\cdot\rho_j\right] \quad (6)$$

where $\rho_j$ is the correlation between the first sample and the $j^{th}$ sample in a sequence of n samples. The $\rho_j$ terms associated with a sequence of n samples may be estimated from simulations of characteristic traffic or other methods, and a minimum number of cycles for accuracy may be determined.

A conservative approach is to sample for at least the average MBS of all the current connections 42 served by the WRR queues. Preferably and for statistical reasons, the quantity of samples is greater than 30. These restrictions on the estimate on the variance of the mean, equation 6, result in:

$$\hat{V}ar[X(n)] = \frac{S^2(n)}{n}\left[1 + 2(\overline{MBS} - 1)\left(1 - \frac{\overline{MBS} + n}{2n} + \frac{2\overline{MBS} - 1}{6n}\right)\right], \quad (7)$$

$$n \geq \min(30, \overline{MBS}).$$

The sample mean, $\overline{X}(n)$, and variance of the sample mean, $\hat{V}ar[\overline{X}(n)]$, will be evaluated at each WRR cycle (i.e., as n increases) until new connection M is admitted. The mean and variance estimates are used for the admission of additional connections in a virtual path at any time after the required 30 cycles has elapsed. Other numbers of cycles and variance estimations may be used.

The sample mean is used in conjunction with the estimate of the variance to calculate a current value for an allowable mean $\mu_A(n)$. Since a true mean is unknown, knowledge of $\overline{X}(n)$ and $\hat{V}ar[X(n)]$ is used to determine the allowable mean $\mu_A(n)$ that is less than the true mean, $\mu_x$, with a specified level of confidence. Measurements of $\overline{X}(n)$ can be used as if they were from a normal distribution after n=30 cycles of the WRR have elapsed. In one preferred embodiment, evaluation of the allowable mean is accomplished after $\overline{MBS}$ cycles have elapsed, where $\overline{MBS}$ is the average maximum burst size of the traffic streams entering the queues that make up the WRR queues. For a greater number of cycles, the allowable mean better approximates the true mean.

Since the true mean is unknown, true mean is estimated with statistical inference as the allowable mean. Statistical inference using the measured sample mean and variance may be accomplished through one of two principal techniques, estimation of parameters and tests of statistical hypotheses. Estimation of parameters is accomplished through either point or interval estimates. Other estimations may be used.

Using statistical analysis, confidence intervals for unknown mean values may be determined from the measured sample mean and the measured sample variance of a distribution having true mean $\mu_x$ and variance $\sigma_x^2$. If the variance of the distribution is unknown, then the test statistic $$A = \frac{X(n) - \mu_x}{\sqrt{\frac{S^2}{n}}} \quad (8)$$

has an approximately normal distribution as long as the sample size is large, and as long as the measured sample mean per cycle are independent and uncorrelated.

Using the above statistic A, a confidence interval for the value of $\mu_x$ may be constructed by defining a confidence level between 0 and 1 such that the confidence level equals $1-\alpha$, where $\alpha$ is the probability of the mean being outside of the interval. For example, at an $\alpha$ of 0.01, using standard normal probability distributions, $$\Pr\left(\frac{\overline{X}(n) - \mu_x}{\sqrt{\hat{V}ar[\overline{X}(n)]}} \leq 2.326\right) = .99 \quad (9)$$

Equation (9) is solved for $\mu_x$ providing $$Pr(X(n) - 2.326 \cdot Var[X(n)] \leq \mu_x) = 0.99 \quad (10)$$

Equation (10) demonstrates that if 100 experiments are run with at least 30 samples being taken from the distribution during each experiment, then in 99 of the experiments, the true mean of the distribution is expected to be greater than the quantity $X(n) - 2.326 \cdot Var[X(n)]$. Equation (10) is generalized to any $\alpha$ as:

$$\Pr\left(\overline{X}(n) - [\Phi^{-1}(1-\alpha)] \cdot Var\left[\hat{X}(n)\right] \leq \mu_x\right) = 1 - \alpha, \quad (11)$$

where $\Phi^{-1}(1-\alpha)$ is the value of the normal distribution associated with cumulative probability less than $1-\alpha$. The allowable mean, $\mu_A$, is defined such that:

$$Pr(\mu_A \leq \mu_x) = 1 - \alpha. \quad (12)$$

Since the allowable mean is a function of n, the allowable mean is solved as:

$$\mu_A(n) = X(n) - [\Phi^{-1}(1-\alpha)] \cdot Var\left[\hat{X}(n)\right] \quad (13)$$

Since $\mu_A(n)$ will be less than the true mean $\mu_x$ with a desired level of confidence, the allowable mean is used to determine the allowable bandwidth instead of the unknown true mean. Using the allowable mean results in a conservative estimate of the allowable bandwidth since the allowable bandwidth is less than that would result from the use of the true mean, within the specified level of confidence.

There are two preferred methods for calculating the allowable bandwidth or SCR of additional connection from the allowable mean. First, these methods are described as a function of the true mean. Second, use of an estimate of the true mean, designated as the allowable mean, is described for use with the two methods.

One method takes into account the probability that at least one cell time slot will be empty every c cycles of the WRR cycle. The second method takes into account the probabilities that one or more timeslots will be empty ever $c_1$ cycles of the WRR, two or more timeslots will be empty every $c_2$ cycles, three or more timeslots will be empty every $c_3$ cycles, etc., where $c_1 < c_2 < C_3 \ldots < c_N$. The single empty time slot method may be computationally less intensive that the multiple empty timeslot method, and may be more conservative in determining the allowable bandwidth. However, the multiple empty timeslot method allows the admission of the additional connection with a larger bandwidth or SCR than the single empty timeslot method for more efficient utilization of the bandwidth of virtual path 12.

For the single empty slot method and based on various mathematical approximations, an estimate of the allowable bandwidth in terms of SCR of additional connection 80 using the method has a bound of $$\hat{R}_{ASCR} = \frac{R_{VP} \cdot \mu_x}{N \cdot \ln\left(\frac{1}{\varepsilon}\right) + \mu_x} \quad (14)$$

where $R_{vp}$ is the bandwidth of virtual path 12, and $\Gamma$ is $\geq$ the cell loss ratio user traffic discriptor. $\hat{R}_{ASCR}$ represents the SCR of additional connection 80 that may be admitted to virtual path 12 served by WRR queues having N timeslots per cycle, where the true mean, $\mu_x$, is an unknown; $R_{vp}$, and $\epsilon$ are known from system or user provided parameters. $\hat{R}_{ASCR}$ may also be expressed in terms of a normalized mean number of empty slots per N-cell time slots per cycle, $\mu_{XN} = \mu_X/N$, resulting in $$R_{ASCR} = \frac{R_{VP} \cdot \mu_{XN}}{\ln\left(\frac{1}{\varepsilon}\right) + \mu_{XN}} \text{ cells/sec}, 0 \leq \mu_{xn} \leq 1 \quad (15)$$

For the multiple time slot method and based on various mathematical approximations, an estimate of the allowable bandwidth $R_{ASCR}$ is:

$$R_{ASCR} = R_{VP} \cdot \sum_{i=1}^{N} \left\{ \frac{1}{\left[\frac{\ln \varepsilon}{\ln[\Phi \hat{\Psi}_i]} \cdot N\right] + 1} \right\} \text{ cells/second} \quad (16)$$

where $$\Psi_i = \frac{\frac{i}{N} - \frac{.5}{N} - \frac{\mu_x}{N}}{\sqrt{\frac{\mu_x}{N}\left(1 - \frac{\mu_x}{N}\right)}},$$

$\Phi(\hat{\Psi}i)$ is the normal probability function and CLR$\leq \epsilon$

Equation 16 was derived from a normal approximation to a binominal distribution. This approximation is only completely accurate for infinitely large values of N, since the binomial distribution approaches the normal distribution as N increases without limit. For smaller values of N, a smaller estimate of $R_{ASCR}$ is provided. The most conservative estimate of $R_{ASCR}$ occurs for the smallest acceptable value of N. The smallest acceptable value of N may be 10 based on statistical analysis.

Both the single and multiple empty timeslot methods described above result in an estimate of an allowable bandwidth or SCR rate, the mean number of empty slots per cycle $\mu_x$ is required to determine $R_{ASCR}$, based on Equations 15 and 16. This mean may be estimated in real time by measurement of the number of empty timeslots being sent to the virtual path as the WRR cycles as discussed above. The relationship between $\mu_x$ and $R_{ASCR}$ as calculated from equations (15) and (16) is shown in FIG. 6 for the single empty timeslot method and in FIG. 7 for the multiple empty timeslot method.

Figure 6:
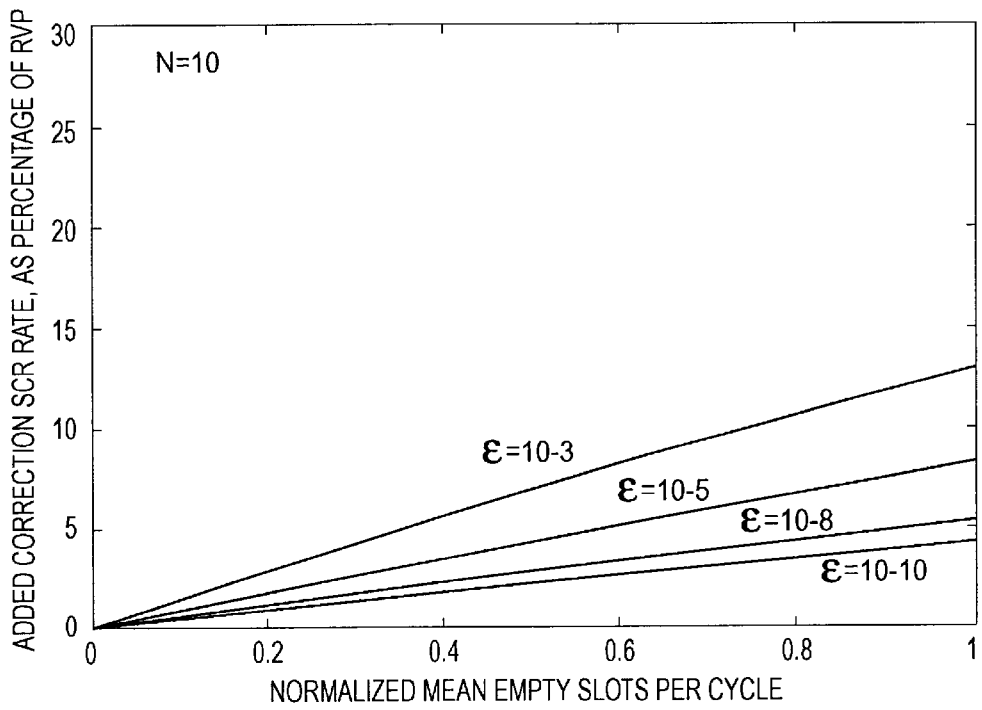
FIG. 6 is a graph of allowable bandwidth as a function of mean empty slots per cycle using a single empty time slot method.
Figure 7:
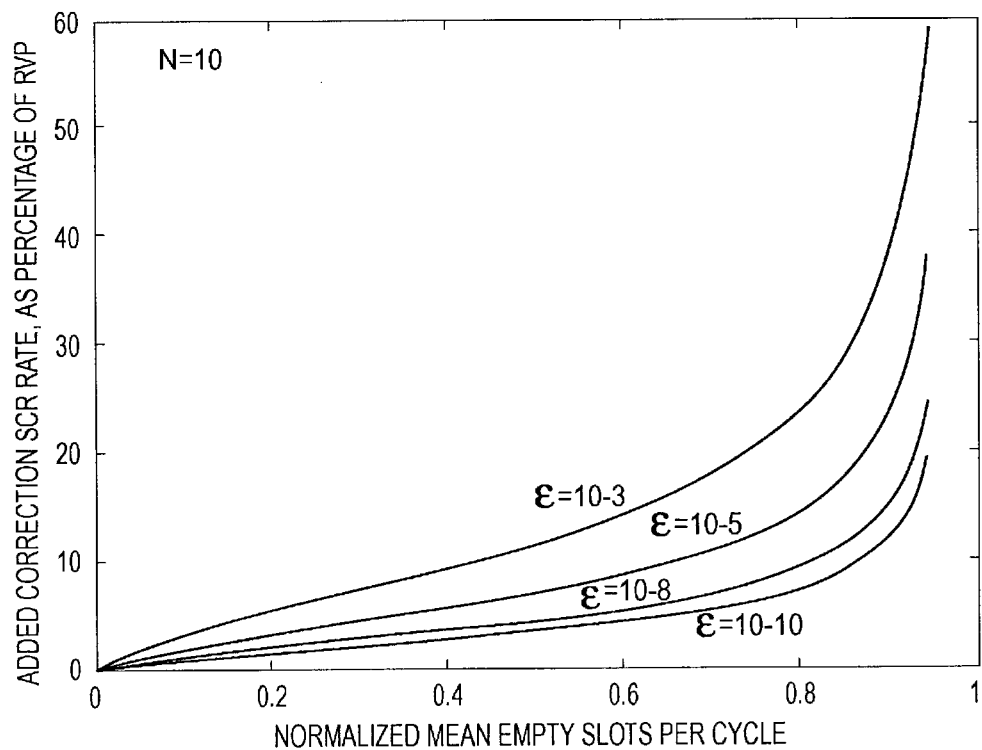
FIG. 7 is a graph of allowable bandwidth as a function of mean empty slots per cycle using a multiple empty time slot method.

In alternate embodiments, a look-up table representing one of the functions of FIGS. 6 and 7 is used to determine the allowable bandwidth for a given CLR (i.e., $\epsilon$) and mean $\mu_x$. Different equations and the resulting graphs may be used.

Using $\mu_A(n)$ in Equations 14 and 16 provides:

$$\hat{\hat{R}}_{ASCR}(n) = \frac{R_{VP} \cdot \mu_A(n)/N}{\ln\left(\frac{1}{\epsilon}\right) + \mu_A(n)/N} \quad (17)$$

for the single probability method, and $$\hat{\hat{R}}_{ASCR}(n) = R_{VP} \cdot \sum_{i=1}^{N}\left[\frac{1}{\left[\frac{\ln \epsilon}{\ln\left[\Phi\left(\hat{\hat{\Psi}}_i(n)\right)\right]}\right] \cdot N}\right] \text{cells/second} \quad (18)$$

where $$\hat{\Psi}_i(n) = \frac{\frac{i}{N} - \frac{.5}{N} - \frac{\mu_A(n)}{N}}{\sqrt{\frac{\mu_A(n)}{N}\left(1 - \frac{\mu_A(n)}{N}\right)}}$$

for the multiple probability method. The allowable bandwidth or SCR is determined using either equations (17) or (18) and as a function of the measured number of empty cell time slots. In alternative embodiments, a look-up table representing equations (17) and (18) is used.

In one preferred embodiment, each time a new connection is admitted to the path, the evaluation of the sample mean and variance is restarted. The additional bandwidth or cell rate, $R_D$, of the additional connection 80 is compared to the current value of $R_{ASCR}(n)$. $R_{ASCR}(n)$ is continually re-estimated as the sample mean and variance are updated with every WRR cycle, i.e. as n increases. If $R_D \leq \hat{\hat{R}}_{ASCR}(n)$, admit the connection, $R_D > \hat{\hat{R}}_{ASCR}(n)$, reject the connection.

E. Other Considerations

In one embodiment, dynamic bandwidth control of virtual path 12 is managed based on the measurement of empty cell time slots. For example, if no additional virtual connection requests are received over a specified time period, the allowable bandwidth associated with empty cell time slots in virtual path 12 may be reallocated to a different virtual path. Reallocation preferably has little or no adverse affect on the established traffic on virtual path 12. Reallocation may involve switching different communications network resources, such as queues 52 or 58, to the different virtual path. The different virtual path may be associated with the same or a different source switch 40.

If a request for additional bandwidth for an additional virtual connection is regularly being rejected or there is regularly a zero or small quantity of empty cell time slots in virtual path 12 or if the quantity of empty cell time slots does not vary substantially as a function of time, additional bandwidth may be requested for the virtual connection and associated virtual path 12. To accommodate a request for additional bandwidth, communications network 10 preferably includes a signaling and control mechanism between switches 18. Based on the mechanism, any unused or undedicated network resources may be allocated to virtual path 12.

It should be understood that many changes and modifications can be made to the embodiments described above. For example, different scheduling algorithms, network architectures and switch componentry may be used. As another example, the CAC may only use the level two admission based on the allowable bandwidth and not the level one admission based on the available bandwidth. It is therefore intended that the foregoing detailed description be understood as an illustration of the presently preferred embodiment to the invention and not as a definition of the invention. It is only the following claims, including all equivalents, that are intended to define the scope of the invention.

What is claimed is:

1. A method of connection admission control, the method comprising:

receiving a request to connect a virtual connection to a virtual path;

determining a first bandwidth for the virtual connection;

measuring a number of empty time slots in the virtual path;

determining an allowable bandwidth based on the number of empty slots in the virtual path; and admitting the virtual connection to the virtual path based on the allowable bandwidth being greater than or equal to the first bandwidth.

2. The method of claim 1 wherein the empty time slots comprise idle cell time slots.

3. The method of claim 1 wherein the empty time slots comprise low priority cell time slots.

4. The method of claim 1 wherein the empty time slots comprise unassigned cell time slots.

5. The method of claim 1 wherein the empty time slots comprise cell time slots usable for replacement by high priority cell time slots.

6. The method of claim 1 further comprising denying the virtual connection to the virtual path based on the allowable bandwidth being less than the first bandwidth.

7. The method of claim 1 wherein determining the first bandwidth for the virtual connection is based on a traffic descriptor for the virtual connection.

8. The method of claim 7 wherein the traffic descriptor comprises a peak cell rate.

9. The method of claim 7 wherein the traffic descriptor comprises a sustainable cell rate.

10. The method of claim 7 wherein the traffic descriptor comprises a maximum burst size.

11. The method of claim 1 further comprising:

determining an available bandwidth of the virtual path; and denying the virtual connection to the virtual path based on the available bandwidth being less than the first bandwidth.

12. A switch system comprising:

a virtual connection server configured to receive a request to connect a virtual connection to a virtual path and determine a first bandwidth for the virtual connection; and a virtual path server configured to measure a number of empty time slots in the virtual path, determine an allowable bandwidth based on the number of empty slots in the virtual path, and admit the virtual connection to the virtual path based on the allowable bandwidth being greater than or equal to the first bandwidth.

13. The switch system of claim 12 wherein the empty time slots comprise idle cell time slots.

14. The switch system of claim 12 wherein the empty time slots comprise low priority cell time slots.

15. The switch system of claim 12 wherein the empty time slots comprise unassigned cell time slots.

16. The switch system of claim 12 wherein the empty time slots comprise cell time slots usable for replacement by high priority cell time slots.

17. The switch system of claim 12 wherein the virtual path server is configured to deny the virtual connection to the virtual path based on the allowable bandwidth being less than the first bandwidth.

18. The switch system of claim 12 wherein the virtual connection server is configured to determine the first bandwidth for the virtual connection is based on a traffic descriptor for the virtual connection.

19. The switch system of claim 18 wherein the traffic descriptor comprises a peak cell rate.

20. The switch system of claim 18 wherein the traffic descriptor comprises a sustainable cell rate.

21. The switch system of claim 18 wherein the traffic descriptor comprises a maximum burst size.

22. The switch system of claim 12 wherein the virtual path server is configured to determine an available bandwidth of the virtual path and deny the virtual connection to the virtual path based on the available bandwidth being less than the first bandwidth.

* * * * *